(12) United States Patent
Stinar, Sr.

(10) Patent No.: US 10,737,610 B1
(45) Date of Patent: Aug. 11, 2020

(54) BRAKE AND TURN SIGNAL LIGHT SYSTEM

(71) Applicant: George Stinar, Sr., Chicago, IL (US)

(72) Inventor: George Stinar, Sr., Chicago, IL (US)

( * ) Notice: Subject to any disclaimer, the term of this patent is extended or adjusted under 35 U.S.C. 154(b) by 0 days.

(21) Appl. No.: 16/292,411

(22) Filed: Mar. 5, 2019

(51) Int. Cl.
  *B60Q 1/26* (2006.01)
  *B60Q 1/34* (2006.01)
  *B60Q 1/44* (2006.01)
  *B60Q 1/50* (2006.01)
  *F21S 43/20* (2018.01)
  *F21S 43/19* (2018.01)

(52) U.S. Cl.
  CPC ......... *B60Q 1/2607* (2013.01); *B60Q 1/2615* (2013.01); *B60Q 1/2696* (2013.01); *B60Q 1/34* (2013.01); *B60Q 1/44* (2013.01); *B60Q 1/50* (2013.01); *F21S 43/195* (2018.01); *F21S 43/255* (2018.01); *B60Q 2400/20* (2013.01)

(58) Field of Classification Search
  CPC ...... F21S 43/255; F21S 43/195; B60Q 1/2607
  See application file for complete search history.

(56) References Cited

U.S. PATENT DOCUMENTS

| D311,590 S | 10/1990 | VanRiper |
| 4,987,405 A | 1/1991 | Jakobowski |
| 5,847,513 A | 12/1998 | Host |
| 6,710,709 B1 | 3/2004 | Morin |
| 6,840,660 B2 | 1/2005 | Hymer |
| 9,291,324 B2 | 3/2016 | Huebner |
| 9,561,748 B2 | 2/2017 | Bingle |
| 2014/0062689 A1* | 3/2014 | Huang ................. B60Q 1/2607 340/464 |

FOREIGN PATENT DOCUMENTS

CA    2254906    9/1997

\* cited by examiner

*Primary Examiner* — Anne M Hines
(74) *Attorney, Agent, or Firm* — Kyle A. Fletcher, Esq.

(57) ABSTRACT

The brake and turn signal light system is configured for use with a vehicle. The brake and turn signal light system is a supplemental signaling device. The brake and turn signal light system mounts on the vehicle. The brake and turn signal light system presents an illuminated port turn signal, an illuminated brake signal and an illuminated starboard turn signal that is visible to an individual facing the stern of the vehicle. The brake and turn signal light system is configured for after-market installation on the vehicle. The brake and turn signal light system comprises a signal housing and a plurality of lamps. The plurality of lamps mount in the signal housing. The signal housing attaches to the vehicle such that the plurality of lamps are visible to the individual facing the stern of the vehicle.

17 Claims, 5 Drawing Sheets

BRAKE AND TURN SIGNAL LIGHT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including arrangements of signaling devices, more specifically, an optical signal device primarily intended to give a signal from a first vehicle to one or more other vehicles. (B60Q1/26)

This disclosure is concerned with signaling devices that are configured for use with vehicles regulated by the United States Department of Transportation. The vehicle 103 further comprises a vehicle engine control unit (VECU) 161. The VECU 161 provides DC electrical power that is used for the operation of the lights of the vehicle. The VECU 161 further comprises an electrical ground 162. The vehicle 103 is a commercially available device that falls within the regulatory jurisdiction of the National Highway Transportation Safety Administration within the United States Department of Transportation. For the purposes of this disclosure, the relevant regulatory standards regarding an optical signaling device for a vehicle 103 is found within the Federal Motor Vehicle Safety Standard (49CFR571). The Federal Motor Vehicle Safety Standard is commonly abbreviated as FMVSS. The standards contained within the FMVSS are similar to are similar to Canadian motor vehicle standards. Within the FMVSS, section 108 (49CFR571.108) concerns itself with lights and signaling devices associated with the vehicle 103. Within the FMVSS, section 209 (49CFR571.209) concerns itself with seat belts and enhanced seat belt reminder systems.

The FMVSS requires that a vehicle 103 be equipped with a plurality of brake lights 163 and a plurality of back-up lights 164. Each of the plurality of brake lights 163 is electrically connected to a brake light switch 171. The brake light switch 171 is interlocked with the brake system of the vehicle 103 such that the brake light switch 171 closes to illuminate each of the plurality of brake lights 163 when the brake pedal of the vehicle 103 is depressed. Each of the plurality of back-up lights 164 is electrically connected to a back-up light switch 173. The back-up light switch 173 is interlocked with the transmission of the vehicle 103 such that the back-up light switch 173 closes to illuminate each of the plurality of back-up lights 164 when the transmission of the vehicle is placed in a setting to allow for travel in the reverse direction. The brake light switch 171 is further defined with a brake light lead 172 which electrically connects the brake light switch 171 to the plurality of brake lights 163. The back-up light switch 173 further comprises a back-up light lead 174 which electrically connects the back-up light switch 173 to the plurality of back-up lights 164

The FMVSS further requires that a vehicle 103 be equipped with a plurality of turn signal lights 165 including a plurality of port turn signal lights 166 and a plurality of starboard turn signal lights 167.

Each of the plurality of port turn signal lights 166 is electrically connected to a port turn signal switch 181. The port turn signal switch 181 is provisioned through the VECU 161 such that the port turn signal switch 181 closes to illuminate each of the plurality of port turn signal lights 166 when a port turn is indicated by the vehicle operator. The port turn switch 181 further comprises a port turn signal lead assembly 182 electrically connects the port turn switch 181 to the plurality of port turn signal lights 166.

Each of the plurality of starboard turn signal lights 167 is electrically connected to a starboard turn signal switch 183. The starboard turn signal switch 183 is provisioned through the VECU 161 such that the starboard turn signal switch 183 closes to illuminate each of the plurality of starboard turn signal lights 167 when a starboard turn is indicated by the vehicle operator. The starboard turn signal switch 183, further comprises a starboard turn signal lead assembly 184 electrically connects the starboard turn signal switch 183 to the plurality of starboard turn signal lights 167.

SUMMARY OF INVENTION

The brake and turn signal light system is configured for use with a vehicle. The vehicle comprises a VECU that controls the electrical operation of the vehicle. The brake and turn signal light system is powered and operated through the VECU. The brake and turn signal light system is a supplemental signaling device. The brake and turn signal light system mounts on the vehicle. The brake and turn signal light system presents an illuminated port turn signal, an illuminated brake signal and an illuminated starboard turn signal that is visible to an individual facing the stern of the vehicle. The brake and turn signal light system is configured for after-market installation on the vehicle. The brake and turn signal light system comprises a signal housing and a plurality of lamps. The plurality of lamps mount in the signal housing. The signal housing attaches to the vehicle such that the plurality of lamps are visible to the individual facing the stern of the vehicle.

These together with additional objects, features and advantages of the brake and turn signal light system will be readily apparent to those of ordinary skill in the art upon reading the following detailed description of the presently preferred, but nonetheless illustrative, embodiments when taken in conjunction with the accompanying drawings.

In this respect, before explaining the current embodiments of the brake and turn signal light system in detail, it is to be understood that the brake and turn signal light system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the brake and turn signal light system.

It is therefore important that the claims be regarded as including such equivalent construction insofar as they do not depart from the spirit and scope of the brake and turn signal light system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The brake and turn signal light system 100 (hereinafter invention) is configured for use with a vehicle 103. The vehicle 103 comprises a VECU 161 that controls the electrical operation of the vehicle 103. The invention 100 is powered and operated through the VECU 161. The invention 100 is a supplemental signaling device. The invention 100 mounts on the vehicle 103. The invention 100 presents an illuminated port turn signal, an illuminated brake signal and an illuminated starboard turn signal that is visible to an individual facing the stern of the vehicle 103. The invention 100 is configured for after-market installation on the vehicle 103. The invention 100 comprises a signal housing 101 and a plurality of lamps 102. The plurality of lamps 102 mount in the signal housing 101. The signal housing 101 attaches to the vehicle 103 such that the plurality of lamps 102 are visible to the individual facing the stern of the vehicle 103.

Figure 1:
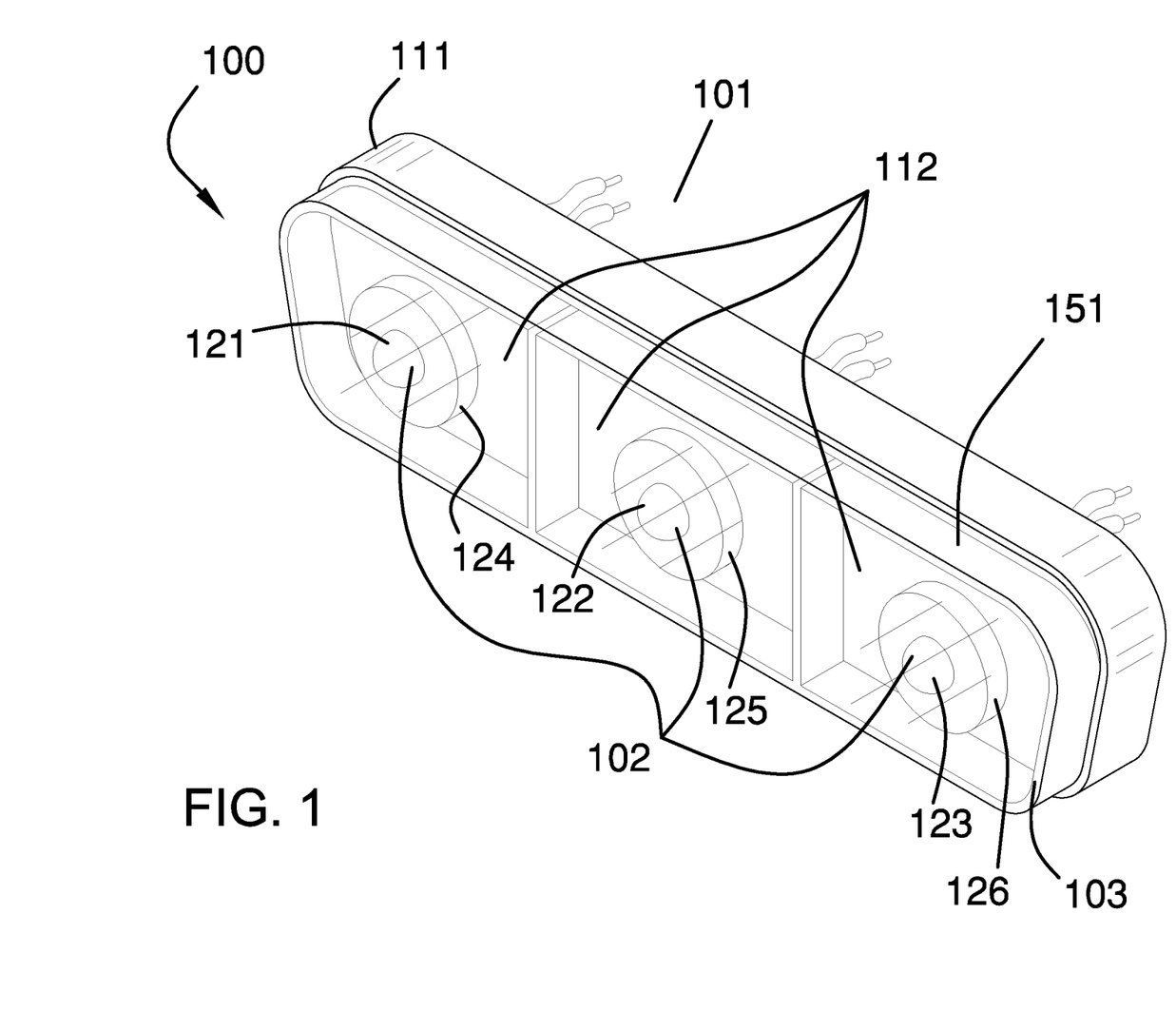
FIG. 1 is a perspective view of an embodiment of the disclosure.
Figure 2:
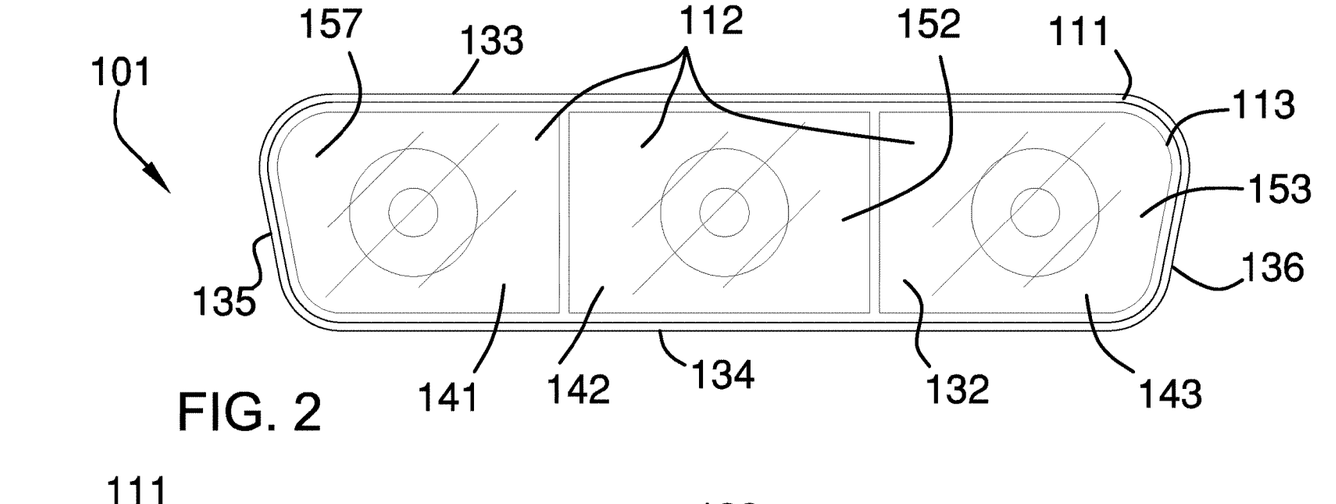
FIG. 2 is a stern view of an embodiment of the disclosure.
Figure 3:
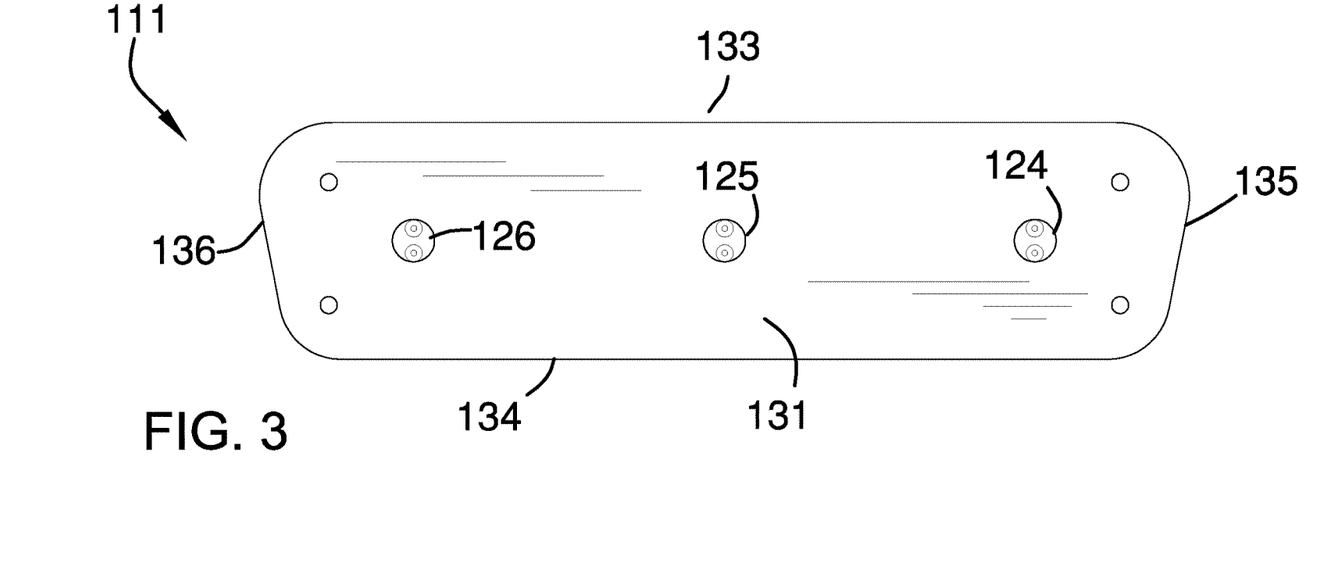
FIG. 3 is a bow view of an embodiment of the disclosure.
Figure 4:
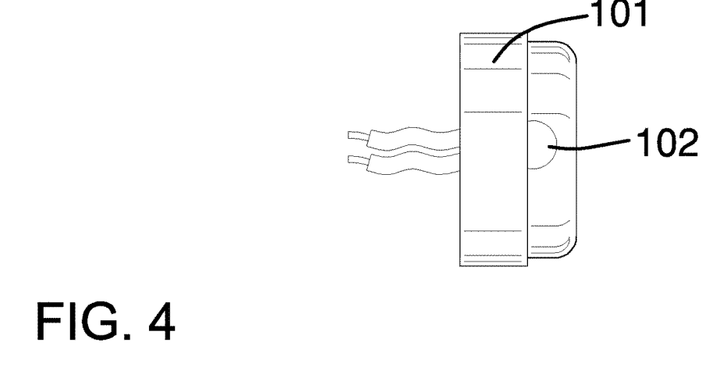
FIG. 4 is a port view of an embodiment of the disclosure.
Figure 5:
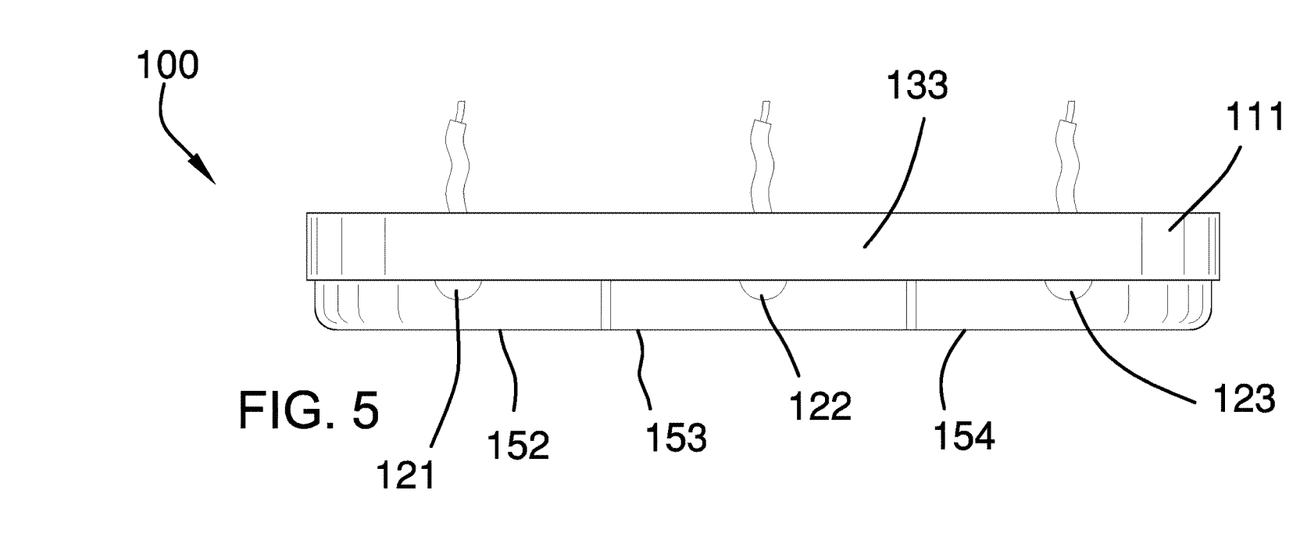
FIG. 5 is a superior view of an embodiment of the disclosure.
Figure 6:
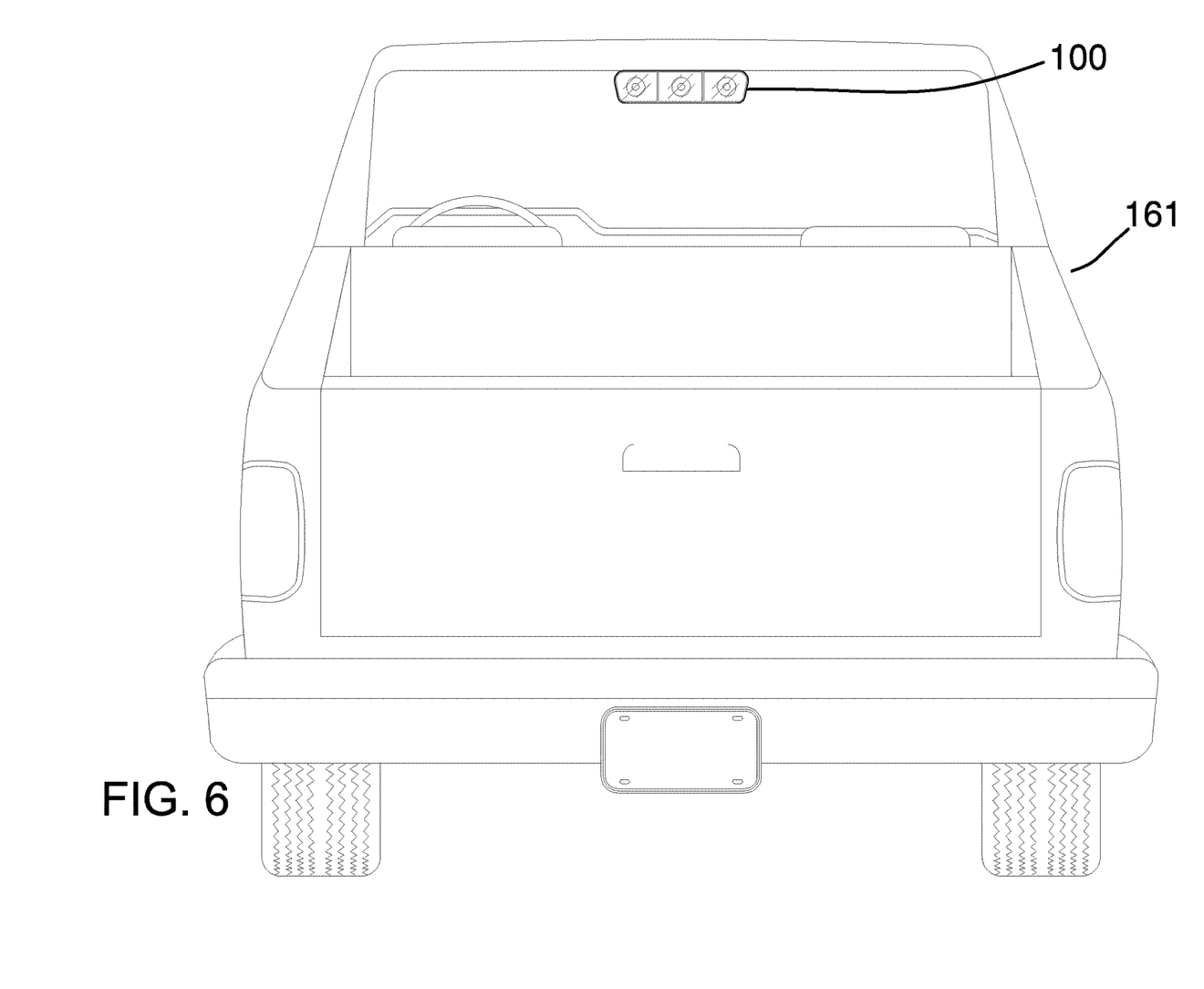
FIG. 6 is an in-use view of an embodiment of the disclosure.
Figure 7:
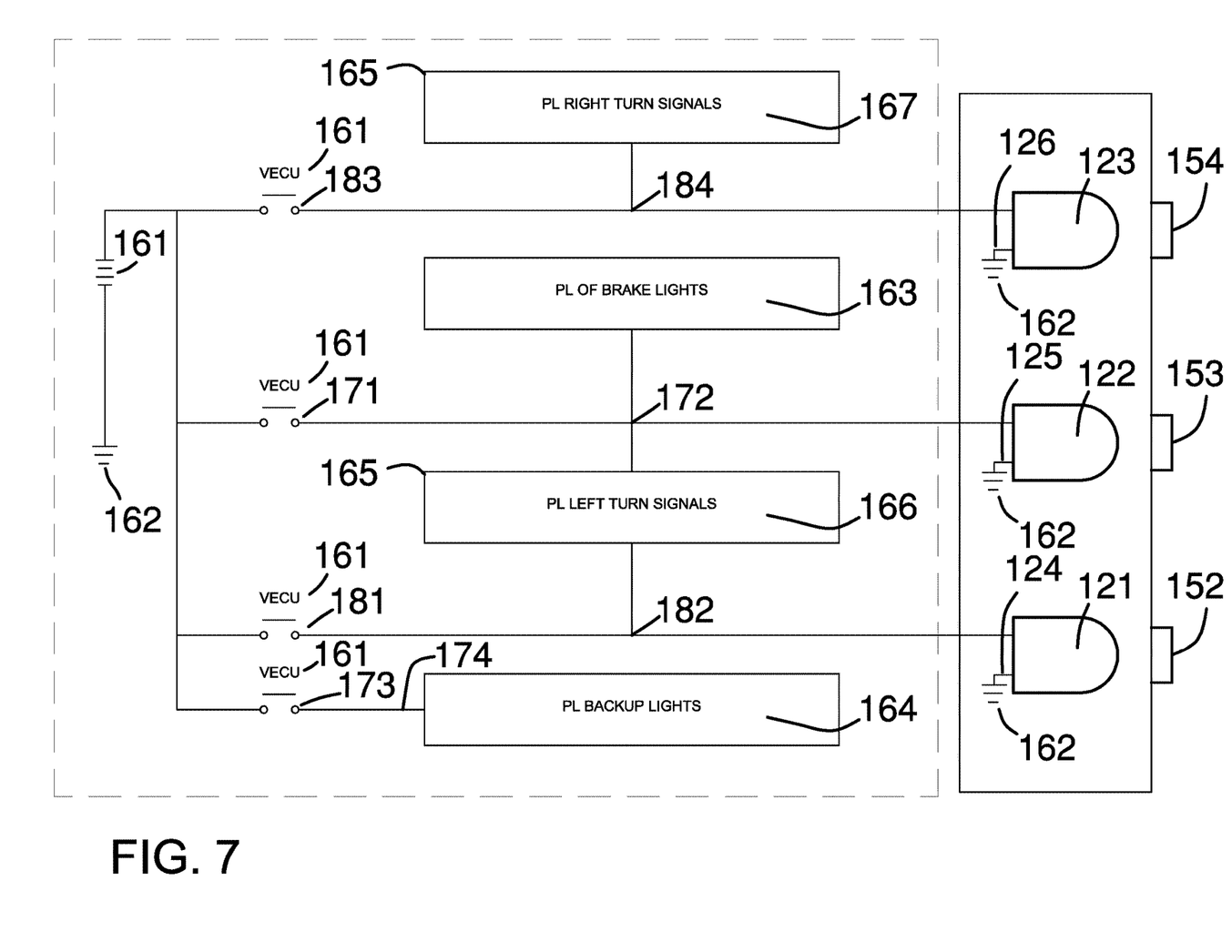
FIG. 7 is a block diagram of an embodiment of the disclosure.

The vehicle 103 comprises a VECU 161, an electrical ground 162, a plurality of brake lights 163, a plurality of back-up lights 164, and a plurality of turn signal lights 165.

The VECU 161 is described in greater detail elsewhere in this disclosure. The electrical ground 162 is described in greater detail elsewhere in this disclosure.

The plurality of brake lights 163 is a system of red-tinted signal lights that indicate to individuals proximal to the vehicle 103 that the vehicle 103 is slowing down.

The plurality of back-up lights 164 is a system of white tinted signal lights that indicate to individuals proximal to the vehicle 103 that the vehicle 103 is traveling in a direction that is reverse relative to the primary sense of direction of the vehicle 103.

The plurality of back-up lights 164 further comprises a back-up light switch 173 and a back-up signal lead 174. The back-up light switch 173 is a relay that is actuated by the VECU 161 when the VECU 161 detects that the vehicle 103 is traveling in a direction that is reverse relative to the primary sense of direction of the vehicle 103. The back-up signal lead 174 is an electrically conductive structure that electrically connects the VECU 161 to the plurality of back-up lights 164.

The plurality of turn signal lights 165 is a system of blue-tinted signal lights that indicate to individuals proximal to the vehicle 103 that the vehicle 103 is intending to change the primary sense of direction of the vehicle 103 in a direction selected from the group consisting of the port direction and the starboard direction. The plurality of turn signal lights 165 further comprises a plurality of port turn signal lights 166 and a plurality of starboard turn signal lights 167.

The plurality of port turn signal lights 166 is a system of blue-tinted signal lights that indicate to individuals proximal to the vehicle 103 that the vehicle 103 is intending to change the primary sense of direction of the vehicle 103 to the port direction.

The plurality of starboard turn signal lights 167 is a system of blue-tinted signal lights that indicate to individuals proximal to the vehicle 103 that the vehicle 103 is intending to change the primary sense of direction of the vehicle 103 to the starboard direction.

The signal housing 101 is a hollow prism-shaped container. The signal housing 101 has a pan shape. The signal housing 101 contains the plurality of lamps 102 such that the plurality of lamps 102 are visible from the exterior of the signal housing 101. The signal housing 101 mounts on the vehicle 103 using a fastener selected from the group consisting of hardware and a magnet. The signal housing 101 comprises a prism structure 111, a plurality of chambers 112, and a lens structure 113.

The prism structure 111 is a hollow prism-shaped container. The prism structure 111 has a pan shape. The prism structure 111 has a roughly rounded rectilinear block shape. The prism structure 111 forms a portion of the exterior surfaces of the signal housing 101. The prism structure 111 is a rigid structure. The prism structure 111 contains the plurality of lamps 102 and the lens structure 113. The prism structure 111 is formed with all apertures and form factors necessary to allow the prism structure 111 to accommodate the use, the operation, and the external connections of the plurality of lamps 102 and the lens structure 113. Methods to form a prism structure 111 suitable for the purposes described in this disclosure are well-known and documented in the mechanical arts.

The prism structure 111 comprises a bow panel 131, a stern face 132, a superior panel 133, an inferior panel 134, a port panel 135, and a starboard panel 136.

The bow panel 131 is a solid face of the pan structure of the prism structure 111. The bow panel 131 forms the bow of the signal housing 101 when the signal housing 101 attaches to the vehicle 103. The stern face 132 is the open face of the pan structure of the prism structure 111. The stern face 132 forms the stern of the signal housing 101 when the signal housing 101 attaches to the vehicle 103. The stern face 132 is distal from the bow panel 131.

The superior panel 133 is a solid face of the pan structure of the prism structure 111. The superior panel 133 forms the superior surface of the signal housing 101 when the signal housing 101 attaches to the vehicle 103. The inferior panel 134 is a solid face of the pan structure of the prism structure 111. The inferior panel 134 forms the inferior surface of the signal housing 101 when the signal housing 101 attaches to the vehicle 103. The inferior panel 134 is distal from the superior panel 133.

The port panel 135 is a solid face of the pan structure of the prism structure 111. The port panel 135 forms the port surface of the signal housing 101 when the signal housing 101 attaches to the vehicle 103. The starboard panel 136 is a solid face of the pan structure of the prism structure 111. The starboard panel 136 forms the starboard surface of the signal housing 101 when the signal housing 101 attaches to the vehicle 103. The starboard panel 136 is distal from the port panel 135.

Each of the plurality of chambers 112 is an enclosed chamber contained within the prism structure 111. There is a one to one correspondence between the plurality of chambers 112 and the plurality of lamps 102. Each of the plurality of chambers 112 contains a lamp selected from the plurality of lamps 102. Any first chamber selected from the plurality of chambers 112 is segregated from any second chamber selected from the plurality of lamps 102. The plurality of chambers 112 comprises a port chamber 141, a brake chamber 142, and a starboard chamber 143.

The port chamber 141 is the chamber within the signal housing 101 that contains the port light bulb 121 and the port lamp socket 124. The port chamber 141 is to the port side of the brake chamber 142 when the signal housing 101 is viewed from the stern. The brake chamber 142 is the chamber within the signal housing 101 that contains the brake light bulb 122 and the brake lamp socket 125. The brake chamber 142 is the center chamber of the signal housing 101 when the signal housing 101 is viewed from the stern. The starboard chamber 143 is the chamber within the signal housing 101 that contains the starboard light bulb 123 and the starboard lamp socket 126. The starboard chamber 143 is to the starboard side of the brake chamber 142 when the signal housing 101 is viewed from the stern.

The lens structure 113 forms a plurality of optical filters. Each optical filter contained in the lens structure 113 tints the light generated by a lamp selected from the plurality of lamps 102. The lens structure 113 mounts in the open stern face 132 of the pan structure of the prism structure 111. The lens structure 113 comprises a lens housing 151, a port lamp lens 152, a brake lamp lens 153, and a starboard lamp lens 154.

The lens housing 151 is a rigid structure. The lens housing 151 contains the port lamp lens 152, the brake lamp lens 153 and starboard lamp 154. The lens housing 151 is formed with all apertures and form factors necessary to allow the lens housing 151 to accommodate the use and operation of the invention 100. Methods to form a lens housing 151 suitable for the purposes described in this disclosure are well-known and documented in the mechanical arts.

The port lamp lens 152 is an optical filter used to tint the illumination generated by the port light bulb 121 a blue shade. The port lamp lens 152 is formed from a filtering material that allows for the passage of electromagnet radiation with wavelengths in the approximate range of 450 to 490 nanometers. The brake lamp lens 153 is an optical filter used to tint the illumination generated by the port light bulb 121 a red shade. The brake lamp lens 153 is formed from a filtering material that allows for the passage of electromagnet radiation with wavelengths in the approximate range of 630 to 700 nanometers. The starboard lamp lens 154 is an optical filter used to tint the illumination generated by the port light bulb 121 a blue shade. The starboard lamp lens 154 is formed from a filtering material that allows for the passage of electromagnet radiation with wavelengths in the approximate range of 450 to 490 nanometers.

Each of the plurality of lamps 102 is an electrical device that generates illumination. Each of the plurality of lamps 102 is independently operated and controlled by the VECU 161 of the vehicle 103. Each of the plurality of lamps 102 is used to signal the intentions of the operator of the vehicle 103. Each of the plurality of lamps 102 are mounted within the signal housing 101 such that each of the plurality of lamps 102 are visible when viewed from the stern of the signal housing 101. The plurality of lamps 102 comprises a port light bulb 121, a brake light bulb 122, a starboard light bulb 123, a port lamp socket 124, a brake lamp socket 125, and a starboard lamp socket 126.

The port light bulb 121 is a two-terminal electrical device used to generate illumination. The port light bulb 121 is selected from the group consisting of a light bulb and a plurality of LEDs. The port lamp socket 124 is an electrical device that forms the electrical connections required to install the port light bulb 121 as a series circuit element between the port turn signal lead assembly 182 and the electrical ground 162 of the vehicle 103. The port lamp socket 124 is a commercially available device that is well-known and documented in the electrical arts.

The brake light bulb 122 is a two-terminal electrical device used to generate illumination. The brake light bulb 122 is selected from the group consisting of a light bulb and a plurality of LEDs. The brake lamp socket 125 is an electrical device that forms the electrical connections required to install the brake light bulb 122 as a series circuit element between the brake signal lead 172 and the electrical ground 162 of the vehicle 103. The brake lamp socket 125 is a commercially available device that is well-known and documented in the electrical arts.

The starboard light bulb 123 is a two-terminal electrical device used to generate illumination. The starboard light bulb 123 is selected from the group consisting of a light bulb and a plurality of LEDs. The starboard lamp socket 126 is an electrical device that forms the electrical connections required to install the starboard light bulb 123 as a series circuit element between the starboard turn signal lead assembly 184 and the electrical ground 162 of the vehicle 103. The starboard lamp socket 126 is a commercially available device that is well-known and documented in the electrical arts.

The plurality of brake lights 163 further comprises a brake light switch 171 and a brake signal lead 172. The brake light switch 171 is a relay that is actuated by the VECU 161 when the VECU 161 detects that the brake system of the vehicle 103 has been actuated. The brake signal lead 172 is an electrically conductive structure that electrically connects the brake light switch 171 to the plurality of brake lights 163 and the brake light bulb 122.

The plurality of port turn signal lights 166 further comprises a port turn signal switch 181 and a port turn signal lead assembly 182. The port turn signal switch 181 is a relay that is actuated by the VECU 161 when the VECU 161 detects that the operator of the vehicle 103 has indicated a desire to make a port turn. The port turn signal lead assembly 182 is an electrically conductive structure that electrically connects the port turn signal switch 181 to the plurality of port turn signal lights 166 and the port light bulb 121.

The plurality of starboard turn signal lights 167 further comprises a starboard turn signal switch 183 and a starboard turn signal lead assembly 184. The starboard turn signal switch 183 is a relay that is actuated by the VECU 161 when the VECU 161 detects that the operator of the vehicle 103 has indicated a desire to make a starboard turn. The starboard turn signal lead assembly 184 is an electrically conductive structure that electrically connects the starboard turn signal switch 183 to the plurality of starboard turn signal lights 167 and the starboard light bulb 123.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Bow: As used in this disclosure, the bow refers to the anterior side of an object, vehicle, or vessel. Specifically, the bow refers to the most forward element of the object in the direction of the primary sense of direction of the object, vehicle, or vessel.

Chamber: As used in this disclosure, a chamber is an enclosed space within a structure.

Electrical Ground: As used in this disclosure, an electrical ground is a common reference voltage used in the design and implementation of electrical circuits. An electrical ground is often, but not necessarily, the discharge point of electric currents flowing through an electric circuit.

Fastener: As used in this disclosure, a fastener is a device that is used to join or affix a first object to a second object.

Filtering Material: As used in this disclosure, a filtering material refers to an object or material that prevents or inhibits the passage of radiation of specific wavelengths through the object or material.

FMVSS: As used in this disclosure, FMVSS is an abbreviation for Federal Motor Vehicle Safety Standard.

Form Factor: As used in this disclosure, the term form factor refers to the size and shape of an object.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern.

Hardware: As used in this disclosure, refers to one or more incidental objects: 1) that are readily and commercially available; and, 2) that are associated with the installation, operation or maintenance of a primary object. Always use incidental.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid casing that encloses and protects one or more devices.

Illumination: As used in this disclosure, light refers to electromagnetic radiation contained with an area. Illumination is a synonym for light, particularly in cases where a measure of the amount of visible electromagnetic radiation in a space is called for.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

LED: As used in this disclosure, an LED is an acronym for a light emitting diode. A light emitting diode is a diode that is also a light source. Because of close operational correspondence of the function of the cathode and anode of an organic LEDs and the cathode and anode of a semiconductor LED, organic LEDs are included in this definition.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Opaque: As used in this disclosure, opaque refers to an object or material that prevents the passage of radiation through the object or material.

Optical Filter: As used in this disclosure, an optical filter is a semi-transparent structure that in any combination: 1) reduces the amount of light that passes through the optical filter; 2) allows only light of specified wavelengths to pass through the optical filter; or, 3) blocks light of specified wavelengths from through the optical filter.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Rigid Structure: As used in this disclosure, a rigid structure is a solid structure formed from an inelastic material that resists changes in shape. A rigid structure will permanently deform as it fails under a force.

Rounded: A used in this disclosure, the term rounded refers to the replacement of an apex, vertex, or edge or brink of a structure with a (generally smooth) curvature wherein the concave portion of the curvature faces the interior or center of the structure.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Tinted: As used in this disclosure, a tinted object is an first object made of first transparent material that has been coated, treated, or processed with a second material that reduces the amount of light that passes through the transparent material of the first object while not significantly scattering the light that passes through the first transparent material such that object behind the first object would remain clearly visible.

Transparent: As used in this disclosure, transparent refers to a material that allows light to pass through the material without significant scattering such that an object can be clearly seen through the material. See tinted opaque Transistor: As used in this disclosure, a transistor is a general term for a three-terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation. The transistor operates in either an amplifier mode or a switch mode. In the amplifier mode, when a first current flows into the base, a second current flows from the collector to the emitter. The amount of the second current is a linear function of the first current. In this mode, the transistor acts as an amplifier. The operation of a transistor moves to a switching mode when the first current reaches the saturation levels of the transistor. In the switch mode, when a voltage is applied to the base, current will flow into the base and the transistor will act like a closed switch allowing current to flow from the collector to the emitter. When the voltage is removed from the base, the transistor will act like an open switch disrupting current flow from the collector to the emitter.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An optical signal device comprising:
a signal housing and a plurality of lamps;
wherein the plurality of lamps mount in the signal housing;
wherein the optical signal device is configured for use with a vehicle;
wherein the vehicle comprises a vehicle engine control unit (hereinafter VECU);
wherein the optical signal device is powered and operated through the VECU;
wherein the optical signal device mounts on the vehicle;
wherein the vehicle is further defined with a bow, a stern, a superior direction, and inferior direction, a port direction, and a starboard direction;
wherein the vehicle further comprises an electrical ground, a plurality of brake lights, a plurality of back-up lights, and a plurality of turn signal lights;
wherein the electrical ground is a voltage reference used by the VECU and the optical signaling device;
wherein the plurality of brake lights is a system of red-tinted signal lights that indicate the vehicle is slowing down;
wherein the plurality of turn signal lights is a system of blue-tinted signal lights that indicate the vehicle is intending to change the primary sense of direction of the vehicle in a direction selected from the group consisting of the port direction and the starboard direction;
wherein the plurality of turn signal lights further comprises a plurality of port turn signal lights and a plurality of starboard turn signal lights;
wherein the plurality of port turn signal lights is a system of blue-tinted signal lights that indicate the vehicle is intending to change the primary sense of direction of the vehicle to the port direction;
wherein the plurality of starboard turn signal lights is a system of blue-tinted signal lights that indicate the vehicle is intending to change the primary sense of direction of the vehicle to the starboard direction
wherein the signal housing comprises a prism structure, a plurality of chambers, and a lens structure;
wherein the plurality of chambers are formed in the prism structure;
wherein the lens structure attaches to the prism structure;
wherein each of the plurality of chambers is an enclosed chamber;
wherein there is a one to one correspondence between the plurality of chambers and the plurality of lamps;
wherein each of the plurality of chambers contains a lamp selected from the plurality of lamps;
wherein any first chamber selected from the plurality of chambers is segregated from any second chamber selected from the plurality of lamps.

2. The optical signal device according to claim 1
wherein the optical signal device presents an illuminated port turn signal, an illuminated brake signal and an illuminated starboard turn signal that is visible from the stern of the vehicle;
wherein the signal housing attaches to the vehicle such that the plurality of lamps are visible from the stern of the vehicle.

3. The optical signal device according to claim 2
wherein the signal housing is a hollow prism-shaped container;
wherein the signal housing has a pan shape;
wherein the signal housing contains the plurality of lamps such that the plurality of lamps are visible from the exterior of the signal housing.

4. The optical signal device according to claim 3
wherein each of the plurality of lamps is an electrical device that generates illumination;
wherein each of the plurality of lamps is independently operated and controlled by the VECU of the vehicle;
wherein each of the plurality of lamps signal the intentions of the vehicle;
wherein each of the plurality of lamps are mounted within the signal housing such that each of the plurality of lamps are visible when viewed from the stern of the signal housing.

5. The optical signal device according to claim 4
wherein the prism structure is a hollow prism-shaped container;
wherein the prism structure has a pan shape;
wherein the prism structure forms a portion of the exterior surfaces of the signal housing.

6. The optical signal device according to claim 5
wherein the plurality of chambers comprises a port chamber, a brake chamber, and a starboard chamber;
wherein the port chamber is to the port side of the brake chamber when the signal housing is viewed from the stern;
wherein the brake chamber is the center chamber of the signal housing when the signal housing is viewed from the stern;
wherein the starboard chamber is to the starboard side of the brake chamber when the signal housing is viewed from the stern.

7. The optical signal device according to claim 6
wherein the lens structure forms a plurality of optical filters;

wherein each optical filter contained in the lens structure tints the light generated by a lamp selected from the plurality of lamps;

wherein the lens structure mounts in the open stern face of the pan structure of the prism structure.

8. The optical signal device according to claim 7 wherein the prism structure comprises a bow panel, a stern face, a superior panel, an inferior panel, a port panel, and a starboard panel;

wherein the bow panel is a solid face of the pan structure of the prism structure;

wherein the bow panel forms the bow of the signal housing when the signal housing attaches to the vehicle;

wherein the stern face is an open face of the pan structure of the prism structure;

wherein the stern face forms the stern of the signal housing when the signal housing attaches to the vehicle;

wherein the stern face is distal from the bow panel;

wherein the superior panel is a solid face of the pan structure of the prism structure;

wherein the superior panel forms the superior surface of the signal housing when the signal housing attaches to the vehicle;

wherein the inferior panel is a solid face of the pan structure of the prism structure;

wherein the inferior panel forms the inferior surface of the signal housing when the signal housing attaches to the vehicle;

wherein the inferior panel is distal from the superior panel;

wherein the port panel is a solid face of the pan structure of the prism structure;

wherein the port panel forms the port surface of the signal housing when the signal housing attaches to the vehicle;

wherein the starboard panel is a solid face of the pan structure of the prism structure;

wherein the starboard panel forms the starboard surface of the signal housing when the signal housing attaches to the vehicle;

wherein the starboard panel is distal from the port panel.

9. The optical signal device according to claim 8 wherein the lens structure comprises a lens housing, a port lamp lens, a brake lamp lens, and a starboard lamp lens;

wherein the lens housing contains the port lamp lens, the brake lamp lens and starboard lamp;

wherein the lens housing is a rigid structure.

10. The optical signal device according to claim 9 wherein the plurality of lamps comprises a port light bulb, a brake light bulb, a starboard light bulb, a port lamp socket, a brake lamp socket, and a starboard lamp socket;

wherein the port light bulb electrically connects to the port lamp socket;

wherein the brake light bulb electrically connects to the brake lamp socket;

wherein the starboard light bulb electrically connects to the starboard lamp socket.

11. The optical signal device according to claim 10 wherein the port light bulb is a two-terminal electrical device used to generate illumination;

wherein the port light bulb is selected from the group consisting of a light bulb and a plurality of LEDs;

wherein the brake light bulb is a two-terminal electrical device used to generate illumination;

wherein the brake light bulb is selected from the group consisting of a light bulb and a plurality of LEDs;

wherein the starboard light bulb is a two-terminal electrical device used to generate illumination;

wherein the starboard light bulb is selected from the group consisting of a light bulb and a plurality of LEDs.

12. The optical signal device according to claim 11 wherein the port lamp socket is an electrical device that forms the electrical connections required to install the port light bulb as a series circuit element between the port turn signal lead assembly and the electrical ground of the vehicle;

wherein the brake lamp socket is an electrical device that forms the electrical connections required to install the brake light bulb as a series circuit element between the brake signal lead and the electrical ground of the vehicle;

wherein the starboard lamp socket is an electrical device that forms the electrical connections required to install the starboard light bulb as a series circuit element between the starboard turn signal lead assembly and the electrical ground of the vehicle.

13. The optical signal device according to claim 12 wherein the plurality of port turn signal lights further comprises a port turn signal switch and a port turn signal lead assembly;

wherein the port turn signal switch is a relay that is actuated by the VECU when the VECU detects that the operator of the vehicle has indicated a desire to make a port turn;

wherein the port turn signal lead assembly is an electrically conductive structure that electrically connects the port turn signal switch to the plurality of port turn signal lights and the port light bulb.

14. The optical signal device according to claim 13 wherein the plurality of brake lights further comprises a brake light switch and a brake signal lead;

wherein the brake light switch is a relay that is actuated by the VECU when the VECU detects that the brake system of the vehicle has been actuated;

wherein the brake signal lead is an electrically conductive structure that electrically connects the brake light switch to the plurality of brake lights and the brake light bulb.

15. The optical signal device according to claim 14 wherein the plurality of starboard turn signal lights further comprises a starboard turn signal switch and a starboard turn signal lead assembly;

wherein the starboard turn signal switch is a relay that is actuated by the VECU when the VECU detects that the operator of the vehicle has indicated a desire to make a starboard turn;

wherein the starboard turn signal lead assembly is an electrically conductive structure that electrically connects the starboard turn signal switch to the plurality of starboard turn signal lights and the starboard light bulb.

16. The optical signal device according to claim 15 wherein the port lamp lens is an optical filter used to tint the illumination generated by the port light bulb a blue shade;

wherein the port lamp lens is formed from a filtering material that allows for the passage of electromagnet radiation with wavelengths in the range of 450 to 490 nanometers;

wherein the brake lamp lens is an optical filter used to tint the illumination generated by the port light bulb a red shade;

wherein the brake lamp lens is formed from a filtering material that allows for the passage of electromagnet radiation with wavelengths in the range of 630 to 700 nanometers;

wherein the starboard lamp lens is an optical filter used to tint the illumination generated by the port light bulb a blue shade;

wherein the starboard lamp lens is formed from a filtering material that allows for the passage of electromagnet radiation with wavelengths in the range of 450 to 490 nanometers.

17. The optical signal device according to claim 16 wherein the port chamber is the chamber within the signal housing that contains the port light bulb and the port lamp socket;

wherein the brake chamber is the chamber within the signal housing that contains the brake light bulb and the brake lamp socket;

wherein the starboard chamber is the chamber within the signal housing that contains the starboard light bulb and the starboard lamp socket.

\* \* \* \* \*